United States Patent
Wetsch et al.

(10) Patent No.: US 9,827,711 B2
(45) Date of Patent: Nov. 28, 2017

(54) EDGE ATTACHED FILM-FOAM SHEET

(75) Inventors: Thomas D. Wetsch, St. Charles, IL (US); Darren Keith Green, Hickory, NC (US)

(73) Assignee: Pregis Innovative Packaging LLC, Deerfield, IL (US)

( * ) Notice: Subject to any disclaimer, the term of this patent is extended or adjusted under 35 U.S.C. 154(b) by 901 days.

(21) Appl. No.: 13/453,502

(22) Filed: Apr. 23, 2012

(65) Prior Publication Data

US 2013/0047560 A1 Feb. 28, 2013

Related U.S. Application Data

(60) Provisional application No. 61/477,735, filed on Apr. 21, 2011.

(51) Int. Cl.
  *B23B 23/02* (2006.01)
  *B29C 65/00* (2006.01)
  (Continued)

(52) U.S. Cl.
  CPC ........ *B29C 66/83413* (2013.01); *A47C 31/11* (2013.01); *B29C 65/40* (2013.01); *B29C 65/5035* (2013.01); *B29C 65/5057* (2013.01); *B29C 65/524* (2013.01); *B29C 66/1122* (2013.01); *B29C 66/21* (2013.01); *B29C 66/232* (2013.01); *B29C 66/43* (2013.01); *B29C 66/723* (2013.01); *B29C 66/727* (2013.01); *B32B 3/04* (2013.01); *B32B 7/06* (2013.01); *B32B 7/12* (2013.01); *B32B 27/065* (2013.01); *B32B 27/32* (2013.01); *B29C 65/02* (2013.01); *B29C 65/08* (2013.01); *B29C 65/405* (2013.01);

(Continued)

(58) Field of Classification Search
  CPC ............. B65D 81/03; B65D 2585/647; Y10T 428/42793; Y10T 428/24777; B29C 66/727; A47B 97/00
  USPC ......... 428/192, 195.1, 194, 35.2, 166, 304.4
  See application file for complete search history.

(56) References Cited

U.S. PATENT DOCUMENTS 1,989,794 A * 2/1935 Duvall .................. A47C 31/02
                                                156/467
2,962,158 A * 11/1960 Struthers ...................... 206/591
(Continued)

OTHER PUBLICATIONS

"Furniture Protection" Pactive Advanced Packaging Solutions, www.pactiv.com, 2002.

*Primary Examiner* — Andrew M Tecco
(74) *Attorney, Agent, or Firm* — Dorsey & Whitney LLP

(57) ABSTRACT

The present disclosure generally relates to devices and methods for furniture protection. More particularly, the present disclosure relates to foam-film sheets configured to protect furniture from damage. An exemplary foam-film sheet as disclosed herein includes a sheet of foam material having a first lateral edge and a second lateral edge; a sheet of film material having a first lateral edge and a second lateral edge; a first seal between a portion of the foam material proximate its first lateral edge and a portion of the film material proximate its first lateral edge; and a second seal between a portion of the foam material proximate its second lateral edge and a portion of the film material proximate its second lateral edge, wherein the film and foam are substantially unseated along the entire transverse width between the first and second sealed portions near the lateral edges of the foam material.

28 Claims, 8 Drawing Sheets

(51) Int. Cl.

| | | |
|---|---|---|
| *B32B 3/04* | (2006.01) | |
| *B29C 65/40* | (2006.01) | |
| *B29C 65/50* | (2006.01) | |
| *B29C 65/52* | (2006.01) | |
| *A47C 31/11* | (2006.01) | |
| *B32B 7/06* | (2006.01) | |
| *B32B 7/12* | (2006.01) | |
| *B32B 27/06* | (2006.01) | |
| *B32B 27/32* | (2006.01) | |
| *B29L 31/00* | (2006.01) | |
| *B29C 65/08* | (2006.01) | |
| *B29C 65/74* | (2006.01) | |
| *B29C 65/02* | (2006.01) | |
| *E04F 15/22* | (2006.01) | |
| *B29C 65/48* | (2006.01) | |
| *E04F 15/18* | (2006.01) | |

(52) U.S. Cl.
CPC ...... *B29C 65/4815* (2013.01); *B29C 65/4825* (2013.01); *B29C 65/74* (2013.01); *B29C 66/1142* (2013.01); *B29C 66/431* (2013.01); *B29C 66/71* (2013.01); *B29C 66/72343* (2013.01); *B29L 2031/732* (2013.01); *B32B 2266/025* (2013.01); *B32B 2307/584* (2013.01); *B32B 2479/00* (2013.01); *E04F 15/18* (2013.01); *E04F 15/22* (2013.01); *Y10T 156/1049* (2015.01); *Y10T 156/1054* (2015.01); *Y10T 428/1334* (2015.01); *Y10T 428/24752* (2015.01); *Y10T 428/24777* (2015.01); *Y10T 428/24793* (2015.01); *Y10T 428/24802* (2015.01)

(56) References Cited

U.S. PATENT DOCUMENTS

| | | | | |
|---|---|---|---|---|
| 2,979,836 | A | | 4/1961 | Scholl |
| 3,437,551 | A | | 4/1969 | Marshack |
| 3,669,252 | A | | 6/1972 | Evans |
| 3,829,343 | A | | 8/1974 | Remmert |
| 3,906,128 | A | * | 9/1975 | Burling et al. ............... 428/86 |
| 3,948,436 | A | * | 4/1976 | Bambara ..................... 206/523 |
| 4,087,002 | A | * | 5/1978 | Bambara et al. ............ 206/523 |
| 4,193,499 | A | * | 3/1980 | Lookholder .................. 206/524 |
| 4,256,526 | A | * | 3/1981 | McDaniel ..................... 156/295 |
| 4,620,633 | A | * | 11/1986 | Lookholder .................. 206/523 |
| 4,868,025 | A | * | 9/1989 | Strzelewicz ................. 428/35.2 |
| 5,330,814 | A | * | 7/1994 | Fewell ......................... 428/42.2 |
| 5,386,964 | A | * | 2/1995 | Mayo ........................ 248/346.01 |
| 5,402,892 | A | * | 4/1995 | Jaszai ............................ 206/522 |
| 5,445,858 | A | * | 8/1995 | Nwoko ........................... 428/71 |
| 5,508,078 | A | * | 4/1996 | Stalnaker ....................... 428/71 |
| 5,518,802 | A | | 5/1996 | Colvin et al. |
| 5,882,573 | A | | 3/1999 | Kwok et al. |
| 5,902,540 | A | | 5/1999 | Kwok |
| 5,904,298 | A | | 5/1999 | Kwok et al. |
| 6,006,905 | A | * | 12/1999 | Campbell, Jr. ............... 206/326 |
| 6,189,692 | B1 | * | 2/2001 | Campbell, Jr. ............... 206/326 |
| 6,428,459 | B2 | * | 8/2002 | Campbell, Jr. ............... 493/352 |
| 6,652,933 | B2 | * | 11/2003 | Hall ............................ 428/34.2 |
| 6,851,141 | B2 | * | 2/2005 | McMahan ......................... 5/420 |
| 7,047,705 | B2 | | 5/2006 | Foster |
| 7,485,358 | B2 | | 2/2009 | Benaets |
| 7,682,680 | B2 | * | 3/2010 | McMahan ......................... 428/76 |
| 8,147,951 | B2 | * | 4/2012 | Slovencik .................... 428/316.6 |
| 2004/0171469 | A1 | * | 9/2004 | Brandolini et al. ........... 493/186 |
| 2005/0109655 | A1 | | 5/2005 | Vershum et al. |
| 2010/0092758 | A1 | * | 4/2010 | Slovencik .................... 428/316.6 |

* cited by examiner

EDGE ATTACHED FILM-FOAM SHEET

CROSS-REFERENCE TO RELATED APPLICATIONS

This application claims priority to U.S. Provisional Application No. 61/477,735 filed Apr. 21, 2011. The entire disclosure of the above-referenced application is incorporated herein by reference in its entirety.

FIELD

The present disclosure generally relates to devices and methods for furniture protection. More particularly, the present disclosure relates to a foam-film sheets configured to protect furniture from damage.

BACKGROUND

Furniture is often shipped in a protective bag, such as from the point of manufacture to the point of sale to the consumer, and thereafter to a location where the consumer desires to use the furniture. The distance between the point of manufacture and the point of use may be many hundred of miles apart, and the furniture may go through several modes of transit (e.g., ship, airplane, truck, rail, etc.) therebetween.

Although usually made of strong materials such a wood, metal, composites, etc., furniture is prone to damage. Such damage may include scratches, scrapes, dings, and dents caused by furniture bumping into other pieces of furniture or into parts of the shipping container during transport. Damaged furniture typically cannot be sold at regular retail price, and must be discount, thereby costing the manufacturer and/or the retail outlet profits.

Thus, it is appreciated in the art that furniture should be covered with a protective covering during shipping and transport. One particular type of cover material known in the art is a foam-film composite, as depicted in FIG. 1. As shown therein, a foam-film composite material 100 includes a polyethylene (PE) foam layer 102 with a high density polyethylene material (HDPE) liner film 103 that extends beyond the edges of the foam layer, and a low density polyethylene (LDPE) extrudate layer 101 extruded onto the foam and the overhang of the film layer 102. The liner film 103 is adhered to the foam layer 102, but is sealed to the lateral overhang areas 110a, 110b of the extrudate 101 as indicated by reference numerals 111a and 111b.

U.S. Pat. Nos. 7,047,705 and 7,485,358 disclose examples of flooring underlayment using a film-foam laminate. The disclosure these patents is incorporated herein by reference thereto.

The presently described prior art foam-film composites 100 uses the extrudate to connect to the film beyond the edges of the foam. A more efficient method of manufacturing the foam-film material is desired.

SUMMARY

In one embodiment, disclosed herein is a foam-film sheet that may include a sheet of foam material having a first lateral edge and a second lateral edge; a sheet of film material having a first lateral edge and a second lateral edge; a first seal between a portion of the foam material proximate its first lateral edge and a portion of the film material proximate its first lateral edge; and a second seal between a portion of the foam material proximate its second lateral edge and a portion of the film material proximate its second lateral edge, wherein the foam material and film material are detached from each other in an unsealed area disposed between the first seal and the second seal such that the film is able to slide with respect to the foam in the unsealed area.

In another embodiment, disclosed herein is a furniture bag material that may include the foam-film sheet described above, wherein the foam-film sheet is C-folded about a longitudinal axis, with approximately a first half of the foam-film sheet on one side of the axis and approximately a second half of the foam-film sheet on another side of the axis, and wherein first and second edges thereof are adjacent to one another. It may also include a first transverse seal through the C-fold, thereby sealing the first half to the second half at the first transverse seal, and a second transverse seal through the C-fold at a distance from the first transverse seal, thereby sealing the first half to the second half at the second transverse seal, wherein an opening between the adjacent first and second edges is dimensioned to allow for insertion over a piece of furniture.

In yet another embodiment, disclosed herein is a method for manufacturing a foam-film sheet that may include providing a sheet of foam material; providing a sheet of film material; positioning a first lateral edge of the foam material adjacent a first lateral edge of the film material, and positioning a second, lateral edge of the foam material adjacent a second lateral edge of the film material; and applying a first seal between the foam material and the film material proximate the first lateral edges thereof, and applying a second seal between the foam material and the film material proximate the second lateral edges thereof, such that an unsealed area remains between the first and second seals near the foam material edges to allow the film to slide with respect to the foam. In some variations of this embodiment, the method may include C-folding the foam-film sheet into approximate halves. In further variations, the method may include making a first transverse cut through the C-folded foam-film sheet; making a second transverse cut through the C-folded foam-film sheet at a distance from the first transverse cut; wherein the first and second transverse cuts are made by a heated cutting element that also heat seals a first half of the foam-film sheet on one side of the longitudinal axis to a second half of the foam-film sheet on another side of the longitudinal axis while making the cut, and wherein an opening between the first and second lateral edges is sufficient to allow for insertion over a piece of furniture.

While multiple embodiments are disclosed, including variations thereof, still other embodiments of the present disclosure will become apparent to those skilled in the art from the following detailed description, which shows and describes illustrative embodiments of the disclosure. As will be realized, the disclosure is capable of modifications in various obvious aspects, all without departing from the spirit and scope of the present disclosure. Accordingly, the drawings and detailed description are to be regarded as illustrative in nature and not restrictive.

BRIEF DESCRIPTION OF THE FIGURES

While the specification concludes with claims particularly pointing out and distinctly claiming the subject matter that is regarded as forming the present invention, it is believed that the disclosure will be better understood from the following description taken in conjunction with the accompanying Figures, in which:

DETAILED DESCRIPTION

Figure 3A:
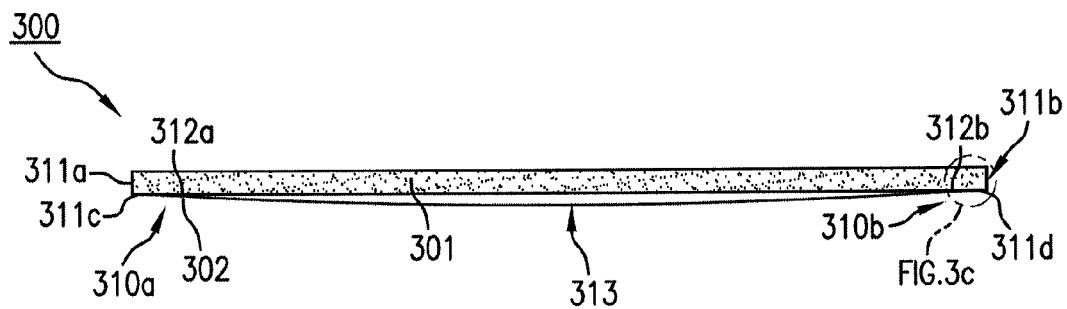
FIGS. 3a-3c depict example cross-sectional views of a foam-film composite in accordance with the present disclosure.
Figure 3B:
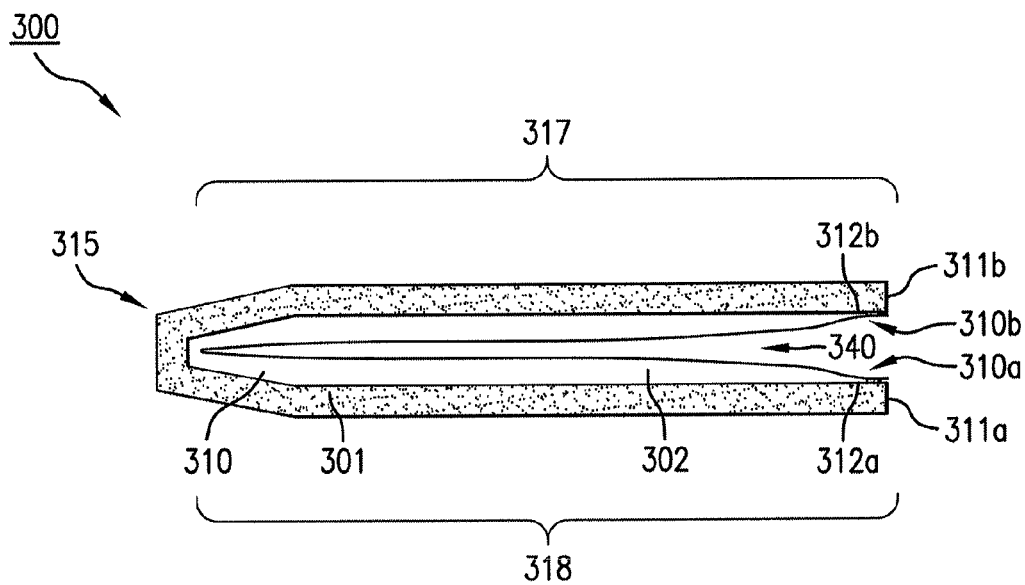
Figure 3C:
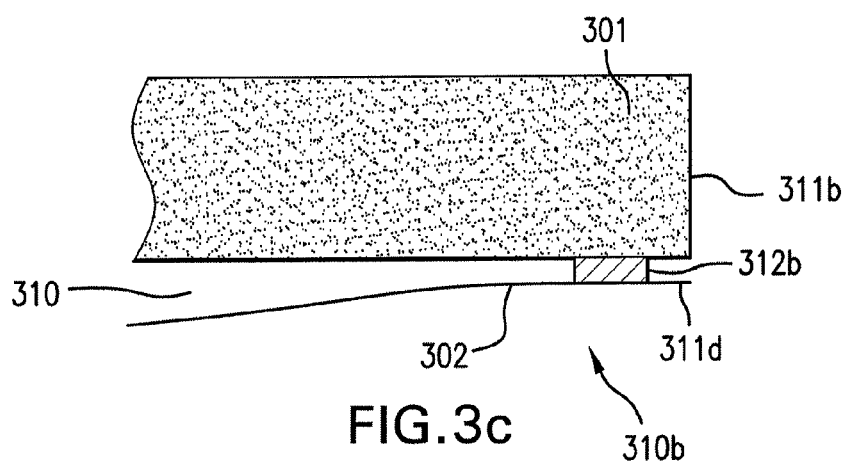

The present disclosure relates to a novel and advantageous foam-film composites that may be configured as furniture covers, among other things, and apparatus and methods for making and using the same. In one embodiment, as depicted in FIGS. 3a-3c, a foam-film composite 300 in accordance with the present disclosure may include a foam sheet 301 and a film sheet 302.

The foam sheet 301 may include one or more lateral edges, for example, a first lateral edge 311a and a second lateral edge 311b. Lateral edges may be provided opposite one another on the sheet, and also generally parallel to one another. The width of the foam sheet, i.e., the distance between lateral edges, may generally be between about 40 inches and 200 inches, but is preferably between about 70 inches and 115 inches, more preferably between about 100 and 110 inches. In an exemplary embodiment, the width of the foam sheet is about 106 inches. The thickness of the foam sheet may generally be between about 0.01 and 0.2 inches, but is preferably between about 0.05 inches and 0.15 inches, more preferably between about 0.07 and 0.08 inches. In an exemplary embodiment, the thickness of the foam sheet is about 0.073 inches. In general, the width and thickness of the foam layer may be relatively consistent along its length, although variations of thickness and width are possible in some embodiments.

The foam sheet 301 may generally be made of any plastic material. Preferably, the foam sheet 301 is made of a polymer material, including, but not limited to, polyethylenes, polypropylenes, polyvinyls, polyurethanes, and any other polymer as may be known in the art, including combinations and mixtures thereof. Most preferably, the foam sheet 301 is made of a low density polyethylene (LDPE). In general, the material from which the foam material is consistent throughout the sheet, although variations in composition are possible in some embodiments.

The film sheet 302 may include one or more lateral edges, for example, a first lateral edge 311c and a second lateral edge 311d. Lateral edges may be provided opposite one another on the sheet 302, and also generally parallel to one another. The width of the film sheet, i.e., the distance between lateral edges, may generally be between about 50 inches and 150 inches, but is preferably between about 90 inches and 115 inches, more preferably between about 100 and 110 inches. In an exemplary embodiment, the width of the film sheet is about 106 inches. The thickness of the film sheet may generally be between about 0.0001 and 0.001 inches, but is preferably between about 0.0002 inches and 0.0007 inches, and in one embodiment between about 0.0004 and 0.0005 inches. In an exemplary embodiment, the thickness of the film sheet is 0.00045 inches. In general, the width and thickness of the film layer may be relatively consistent along its length, although variations of thickness and width are possible in some embodiments.

The film sheet 302 may generally be made of any plastic material. Preferably, the film sheet 302 is made of a polymer material, including, but not limited to, polyethylenes, polypropylenes, polyvinyls, polyurethanes, and any other polymer as may be known in the art, including combinations and mixtures thereof. Most preferably, the film sheet 302 is made of a high density polyethylene (HDPE). In general, the material from which the foam material is consistent throughout the sheet, although variations in composition are possible in some embodiments.

In some embodiments, one or more seals may be provided between the film sheet 302 and the foam sheet 301. As shown in FIG. 3a, a first seal 312a between the film sheet 302 and the foam sheet 301 is provided in an sealed area 310a proximate to, but preferably not exactly at, the first lateral edge of the foam sheet 311a and the first lateral edge of the film sheet 311c. The first proximate area 310a may generally extend along the entire longitudinal length of the film and foam sheets, although in some embodiments it may extend only part way or intermittently therealong. As also shown in FIG. 3a, a second seal 312b between the film sheet 302 and the foam sheet 301 is provided in an area 310b proximate to, but not exactly at, the second lateral edge of the foam sheet 311b and the second lateral edge of the film sheet 311d. The second proximate area 310b may generally extend along the entire longitudinal length of the film and foam sheets, although in some embodiments it may extend only part way or intermittently therealong. FIG. 3c, in particular, provides a close-up view of the second seal 312b, the second proximate area 310b, the second lateral edges 311b and 311d (arrow Z indicating the area of FIG. 3a shown in FIG. 3c). The proximate areas 310a, 310b may generally be between about 0.1 inches and three inches from the lateral edges, but may preferably be between about 0.5 inches and 10 inches from the lateral edges, more preferably between about 0.75 inches and 7 inches. In an exemplary embodiment, the proximate areas are provided about 5 inches from the lateral edges. While two seals are shown in the figures, it will be appreciated that more of fewer seals may be provided consistent with the present disclosure. Further, the proximate areas wherein the seals are located may be provided at consistent distances from the lateral edges, or may vary in distance along the length of the composite. With respect to the width between the first and second edges of the foam and or film material, in some embodiments the first and second seals may be positioned within about 10% of the material width from the respective first and second lateral edges of the respective material, or within about 5%. Spacings of 1%, 15%, 20%, or any percentage thereinbetween are also examples in some embodiments.

The seals 312a, 312b may generally be provided in any manner capable of adhering a film sheet to a foam sheet, including, but not limited to adhesives, tapes, glues, hot-melts, thermo or heat-sealing, thermo or heat-welding, sonic-welding, and lamination, among others. In an exemplary embodiment, the seals are provided as a hot melt glue, and preferably a PSA (pressure sensitive adhesive), such as a hot-melt PSA or another type of known PSA.

The seals 312a, 312b may generally be provided in any pattern and at any interval within the proximate areas 310a, 310b, including but not limited to, one or more continuous strips, one or more intermittent (discontinuous) strips, one or more dashed patterns, one or more dotted patterns, beaded patters, etc. Where adhesive is used, the applicator that applies the adhesive to the film and/or foam can apply a fiberized adhesive, such as in a spiral swirl or random fiber pattern, for example as described in U.S. Pat. Nos. 5,902,540; 5,882,573; and 5,904,298. The seals may also be a plurality of adjacent seal lines disposed near the foam material edge(s). The width of the seals (or strips thereof) 312a, 312b within the proximate areas 310a, 310b may generally be between about 0.05 inches and 1 inch, but may preferably be between about 0.1 inches and 0.5 inches, more preferably between about 0.2 inches and 0.3 inches. In an exemplary embodiment, the seals may provided about ¼ inch wide. Although the various seals provided in the composite may generally be consistent among themselves, in some embodiments, there may be variations among the type of seals, the patterns of the seals, the width of the seals, or other aspects of the configurations of the seals.

An area of adjacency between the film sheet 302 and the foam sheet 301, that are between the seals 312a, 312, as shown in FIG. 3a, for example, are indicated by reference numeral 310. This area 313, which may generally be referred to as an "unsealed" area, may be free of any seals, lamination, or other adhesive that would hold the film sheet 302 to the foam sheet 301. In this manner, the film sheet 302 and the foam sheet 301 may be free to separate, move, or slide relative to one another in the area 310. The film and foam may thus be substantially unsealed along the entire transverse width between the first and second sealed portions near the lateral edges of the foam material. The lateral width of the unsealed area, in some embodiments, may be above 95% of the lateral width of the foam and/or film materials, although in other embodiments, the it can be at least about 20%, 50%, or 75% thereof, for example. The lateral width of the unsealed portion compared to the lateral width of the sealed areas is preferably at least twice as wide, and more preferably at least 3 times, 5 times, or 10 times, or 20 times as wide. In an embodiment of a supply length of the composite sheet, typically provided as a roll, the sealed and unsealed areas extend continuously and preferably uninterruptedly along the entire longitudinal length of the supply material, although other embodiments may have longitudinal portions that are different, such are having a seal or perforation extending laterally thereacross.

Figure 1:
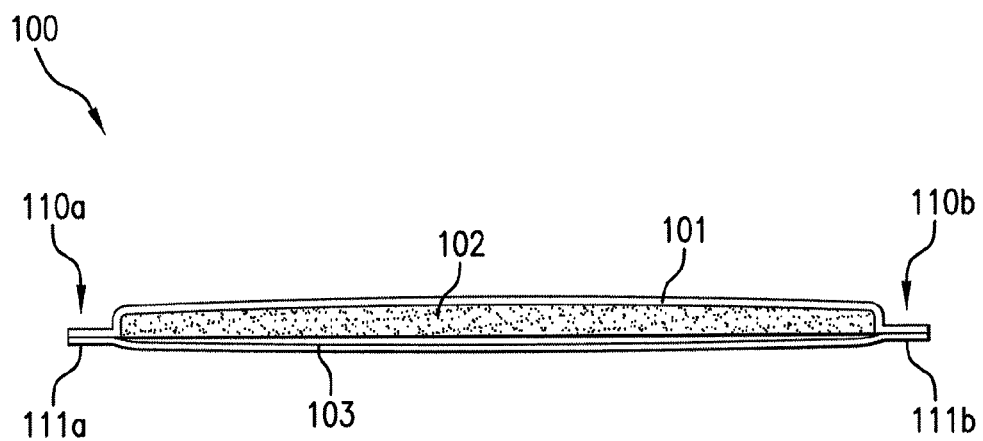
FIG. 1 depicts a cross-sectional view of an example foam-film composite known in the prior art.
Figure 2:
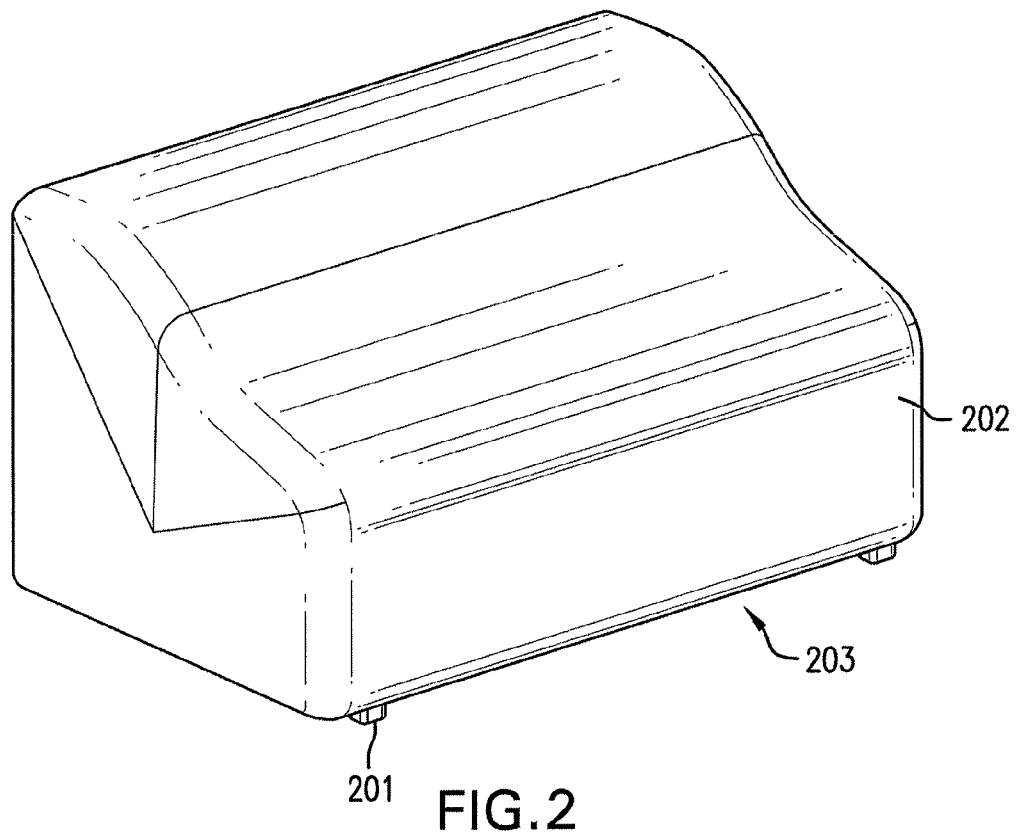
FIG. 2 depicts an example foam-film composite in accordance with the present disclosure configured as furniture covers.

This relationship between the film and foam materials may substantially protect furniture covered with such a composite from damage, abrasions, etc. As shown in FIG. 2, a piece of furniture 201 is covered by a bag 202 of composite material in accordance with the present disclosure to protect the furniture 201 during storage, transport, shipping, handling, moving, etc. The bottom side 203 of the bag 202 is open in this embodiment. Details of how the foam-film composite may be formed into a furniture bag, cover, etc. are discussed in greater detail below.

FIG. 3b depicts a particular embodiment of the foam-film composite 300 that has been "C-folded" about a longitudinal axis running generally through the center of the sheets 301, 302. The C-fold, indicated by reference numeral 315, may be an arcuate bend that generally separates the composite into approximately a first half, or upper half 317 and a second half, or lower half 318. Of course, halves need not result from the C-fold; rather, the ratio could be approximately 40%/60%, 30%/70%, 20%/80%, etc., or any range thereinbetween. As shown, the foam sheet 301 is on the outside of the C-fold, and the film sheet 302 is on the inside of the C-fold, although in some embodiments and opposite configuration may be provided. As can be seen in FIG. 3b, the film sheet 302 remains free to move relative to the foam sheet in the area 310 between the seals 312a, 312, because there is no seal or other adhesive provided in this area 310. In this configuration, the lateral edges 311a-d are now near to, or adjacent one another, with an opening 340 between the first lateral edges (311a, 311c) and the second lateral edges (311b, 311d). The opening extends inward into the "C" of the C-folded composite, until the fold 315.

Figure 4A:
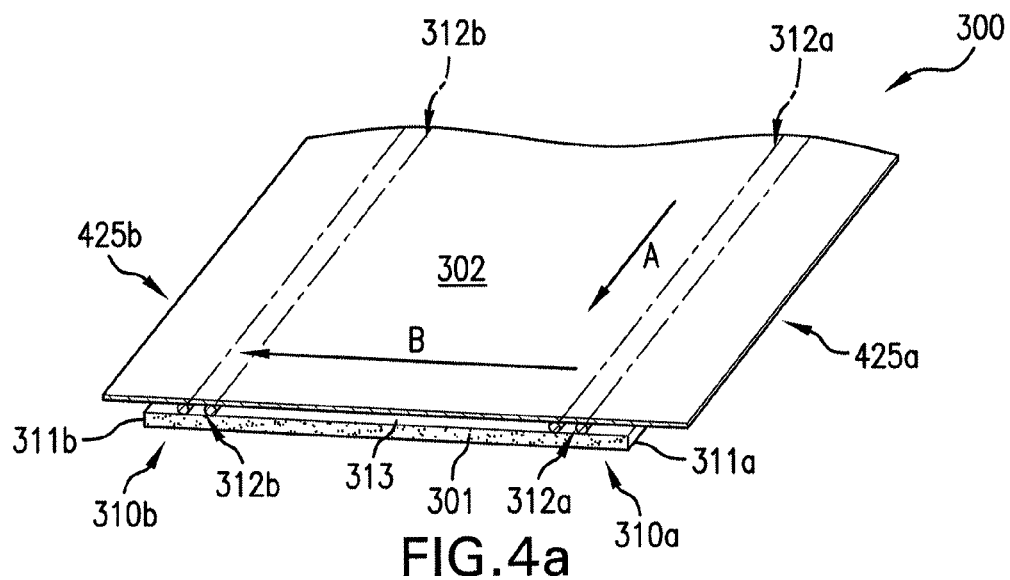
FIGS. 4a-4c depict example perspective views of another example embodiment of a foam-film composite in accordance with the present disclosure, where FIG. 4c has been configured as a furniture cover.

FIG. 4a shows a perspective view of a further embodiment of a foam-film composite in accordance with the present disclosure. The embodiment shown herein may be the same in all material aspects as the foam-film composite described with regard to FIGS. 3a-3c above, except that the film layer may be wider than the foam layer, thereby creating one, two, or more overhang areas 425a, 425b at the lateral edges of the composite. The overhang areas 425a, 425b may generally be provided between about 0.5 inches and 10 inches in length, but are preferably between about 1 inch and 8 inches, more preferably between about 4 inches and 6 inches. In an exemplary embodiment, the overhang areas 425a, 425b may be about 5 inches.

Figure 4B:
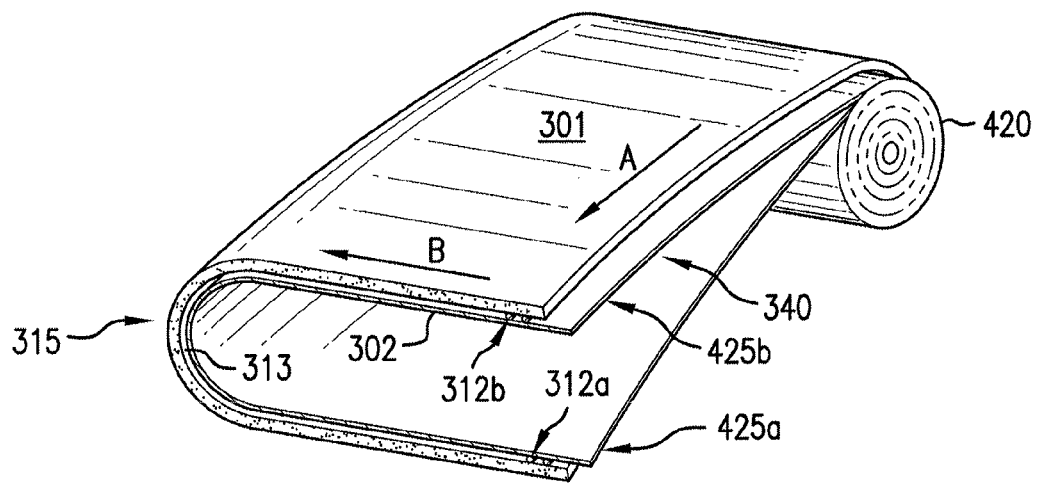

For purposes of discussion, directional arrows A and B are provided to orient the reader, with arrow A pointing generally in a longitudinal direction and arrow B pointing generally in a transverse direction. FIG. 4b depicts an embodiment of a C-folded composite in accordance with any of the composites described above. As shown, the C-folded composite has been wound into a roll 420 along the longitudinal direction. In this configuration, at the end of the roll, the lateral edges 311a-d are now near to, or adjacent one another, with the opening 340 between the first lateral edges (311a, 311c) and the second lateral edges (311b, 311d). The opening extends inward into the "C" of the C-folded composite, until the fold 315. As the roll forms in the longitudinal direction (opposite the direction of arrow A), the first and second halves are forced closer together, and the opening 340 substantially vanishes.

Figure 4C:
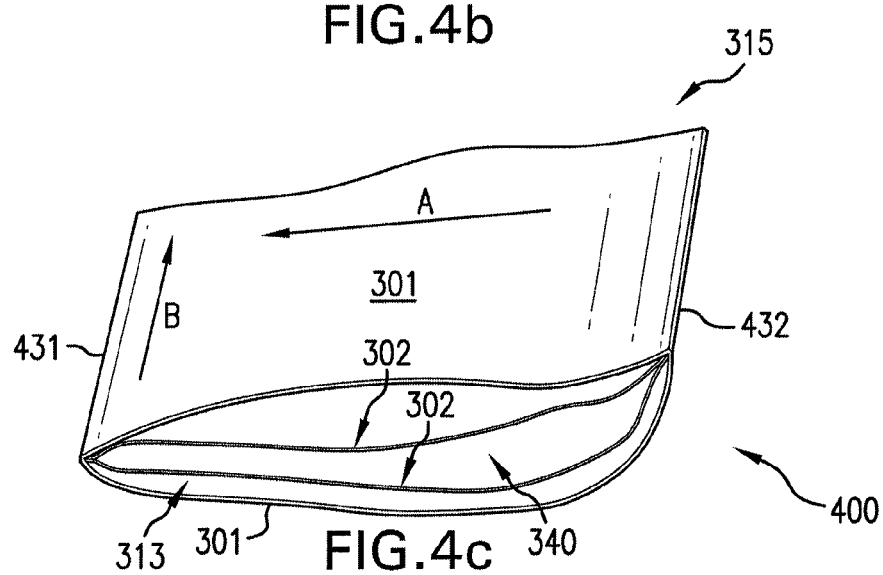

As shown in FIG. 4c, a furniture cover may be fashioned from a C-folded composite, for example a C-folded and rolled composite roll 420 as described above with regard to FIG. 4b. In one embodiment, one or more transverse seals may be made in a transverse direction with respect to the C-fold, as shown by arrow B. For example, a furniture cover 400 is shown in FIG. 4c with two transverse seals 431, 432, positioned opposite one another at a distance. In this manner, a furniture cover may be formed as defined by: on first and second opposite sides, transverse seals 431, 432; on a third side, the C-fold 315; on a fourth side, the opening 340 defined as the opening/space between adjacent lateral edges, 311a, 311c and 311b, 311d formed when the composite is C-folded.

The transverse seals may generally be provided in any manner capable of adhering a film sheet to a foam sheet, including, but not limited to adhesives, tapes, glues, hot-melts, thermo-sealing, thermo-welding, sonic-welding, and lamination, among others. In an exemplary embodiment, the seals are provided as a thermo-seal. In this exemplary configuration, it will be appreciated that a heat-sealer configured for providing said heat-seals may also function as a cutter, that is, it may be a heated cutting element. In this manner, where a roll 420 is provided as the source of the composite, the heated cutting element may instantaneously make transverse cuts and seals (431, 432), thereby separating an individual furniture cover with each such thermo-cut/seal made. That is, each transverse thermo-cut seal/seal made forms the trailing edge transverse seal (i.e., 432 in FIG. 4c) of one furniture cover, while simultaneously forming the leading edge transverse seal (i.e., 431 in FIG. 4c) of another furniture cover (that has yet to be separated from the roll 420). Stated alternatively, the first and second transverse cuts may be made by the heated cutting element that also heat seals a first half of the foam-film sheet on one side of the longitudinal axis to a second half of the foam-film sheet on another side of the longitudinal axis while making the cut. Of course, while transverse cutting and sealing is described herein as a single, simultaneous step due to the thermal operation of such cutter/sealer, it will be appreciated that transverse cutting and sealing may be performed in separate steps, and using other non-thermal methods of performing the same.

In use, a furniture cover 400 as depicted in FIG. 4c may be employed in connection with the protection of a piece of furniture by inserting the opening 340 over the top (or side or bottom, etc.) of a piece of furniture, so as to cover the same. That is, the opening 340 between the adjacent first and second edges may be dimensioned to allow for insertion over a piece of furniture. It will be appreciated that the distance between transverse cuts/seals may be configured with respect to the size of the piece of furniture desired to be covered, wherein larger pieces of furniture will require the cuts/seals to be spaced relatively farther apart, and wherein smaller pieces of furniture can be accommodated with the cuts/seals spaced relatively closer together.

Figure 5A:
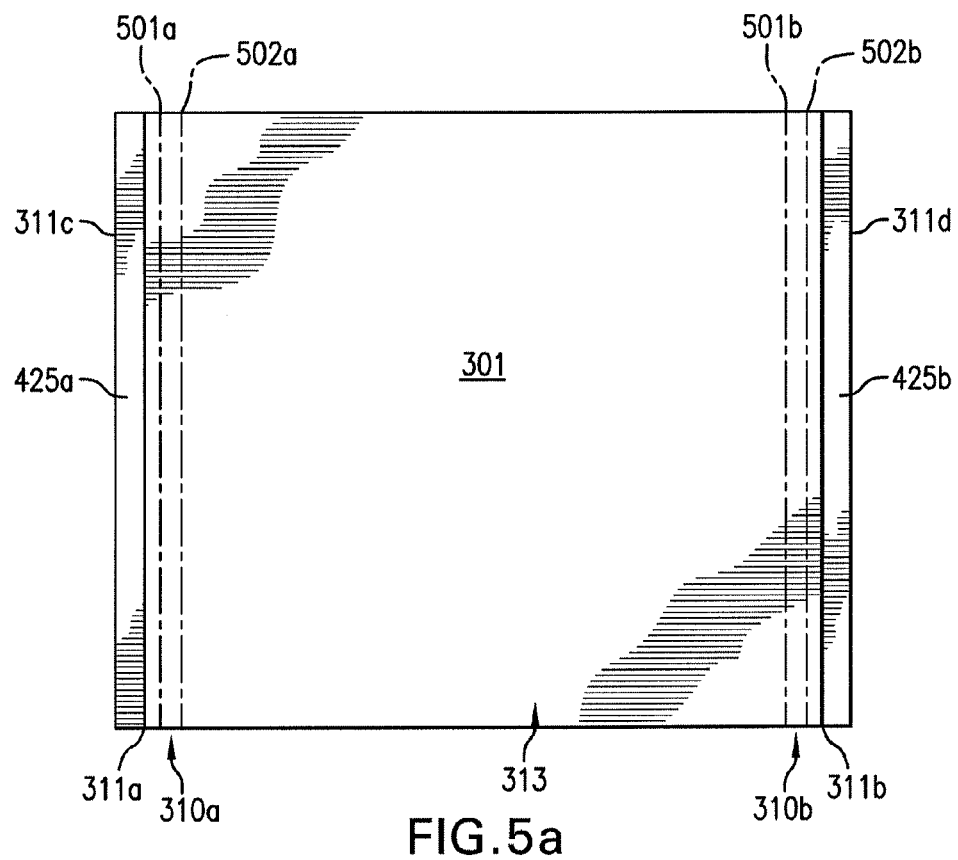
FIGS. 5a-5b depict example top and cross-sectional views, respectively, of a further example embodiment of a foam-film composite in accordance with the present disclosure.
Figure 5B:
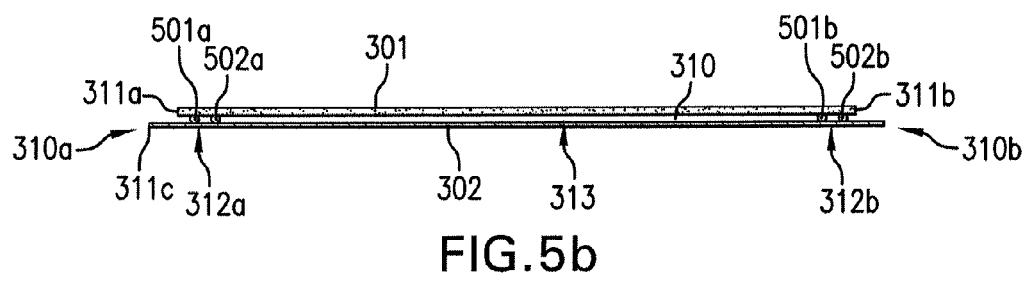

FIGS. 5a and 5b depict a further embodiment of a foam-film composite in accordance with the present disclosure. This embodiment is similar in all material respects to the embodiment of FIG. 4a, with the further specification that the seals 312a, 312b are each provided as two continuous strips, i.e., strips 501a and 502a for seal 312a, and strips 501b, 502b for seal 312b. Such strips 501a, 502a, and 501b, 502b are formed as continuous and substantially parallel strips proximate the lateral edges, 311a-d. Of course, in further embodiments, more or fewer strips may be provided at each respective seal, and each seal may differ in the number of strips provided, among other things.

Figure 6:
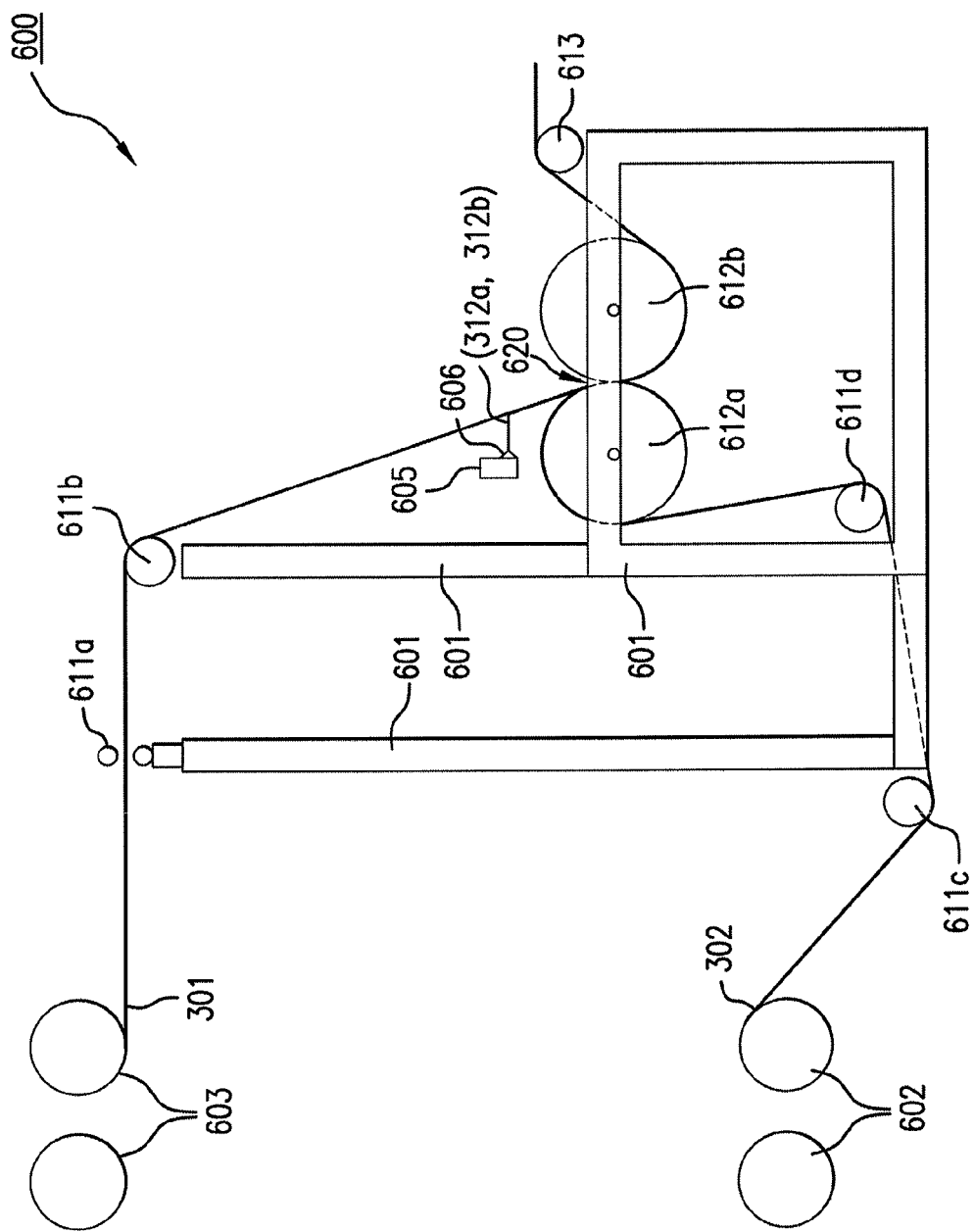
FIG. 6 is an example apparatus for making a foam-film composite in accordance with the present disclosure.
Figure 7:
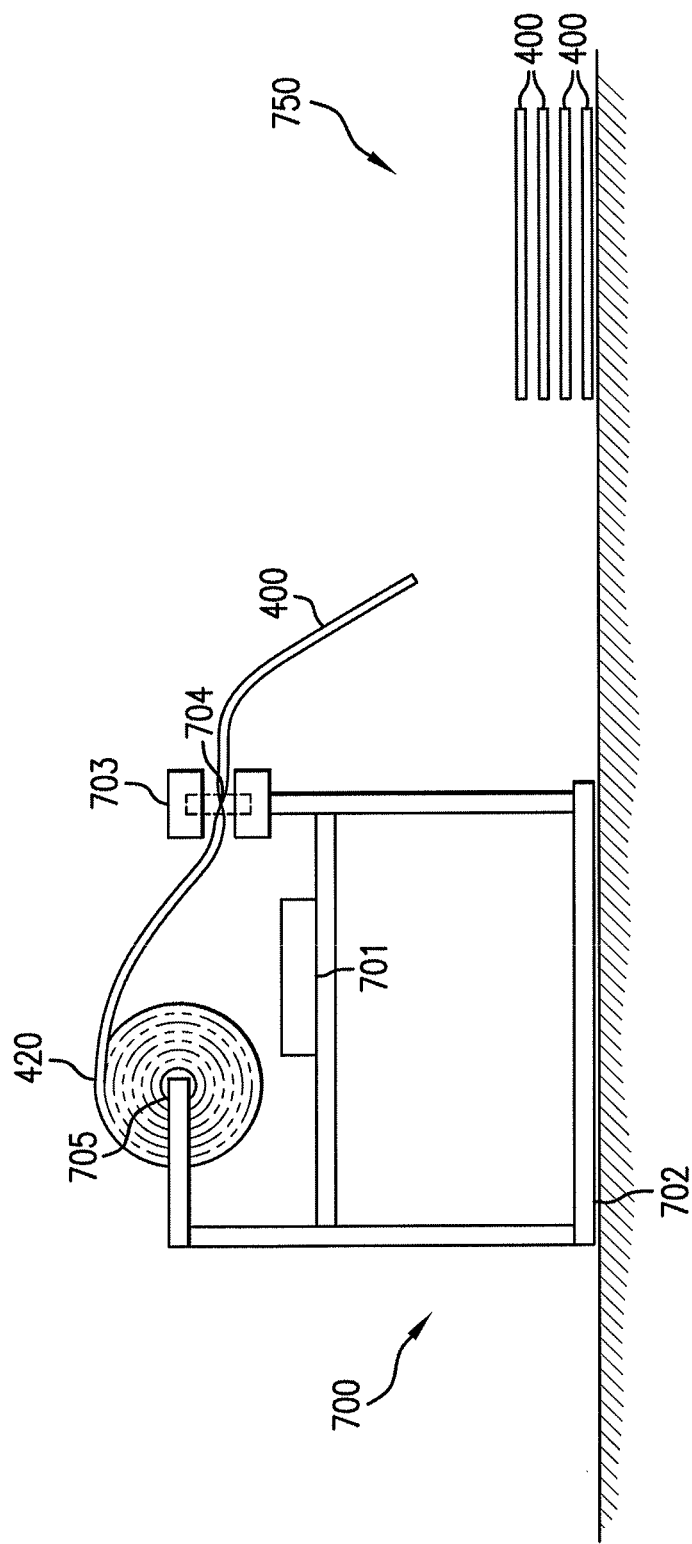
FIG. 7 is an example apparatus for making furniture covers from a roll of the foam-film composites of the present disclosure.

FIGS. 6 and 7 disclose and described embodiments of an apparatus that may be used to make a foam-film composite sheet, and a foam-film composite furniture cover, respectively. With particular reference now to FIG. 6, an apparatus 600 is provided with various structural support members 601, which serve to support and position the various components of the apparatus and the film/foam/seal materials relative to one another. It will be appreciated that the particular configuration of support members is referenced only for purposes of illustration of the embodiment in FIG. 6.

As further shown in FIG. 6, one or more rolls 602 of film material 302 may be provided, and one or more rolls 603 of foam material 301 may be provided. The film material 302 and the foam material 301 may be unrolled from the rolls 602, 603, and conveyed by one or more rollers, 611a, 611b and 611c, 611d to an area where the separate sheets are combined into a composite sheet. As shown in FIG. 6, a seal material, for example, a hot melt glue, may be applied by a dispenser 605 through a directed nozzle 606 to the proximate areas 310a, 310 of the foam sheet 301, thereby creating seals 312a, 312 when the foam sheet 301 comes into aligned contact with the film sheet 302. Such aligned contact may be provided through the operation of one or more adjacent rollers 612a, 612b, which may be configured to bring the foam sheet 301a in proximate contact with the film sheet 301b, thereby allowing the seals 312a, 312b to seal the two said sheets together. Once the composite has been formed, the composite sheet may be directed out of the apparatus by means of an additional roller or rollers, e.g., roller 613 as shown in FIG. 6. It will be appreciated that any one or more of the disclosed rollers 611, 612, 613, etc. may be driven rollers, meaning that they may be mechanically driven by a motor or by other driving means. In alternative embodiments, the apparatus is not driven, but rather the sheets move and come in contact with one in the described manner by human force, e.g., manually pulling the sheets through the apparatus.

With particular reference now to FIG. 7, an apparatus 700 is provided with various structural support members 702, which serve to support and position the various components of the apparatus and the composite sheet relative to one another. It will be appreciated that the particular configuration of support members is referenced only for purposes of illustration of the embodiment in FIG. 7.

As further shown in FIG. 7, one or more rolls of C-folded foam-film composite 420 is provided at a source area of the apparatus. A roller 705, which may be a driven roller, may be provided to unwind the roll 420. The C-folded composite may be fed into a cutting/sealing mechanism component 703 configured to make transverse cuts/seals, as described above. In an exemplary embodiment, the cutting/sealing component may include a thermo-cutter/sealer 704, operably configured to simultaneously make a transverse cut and seal through the composite, in the manner described above using heat. A controller 701 is provided on the apparatus to control all operation aspects thereof, including speed, positioning, configuration, cutting interval, temperature of the thermo-cutter/sealer, etc.

Once the cutting/sealing mechanism makes appropriate transverse cuts/seals through the composite, a completed furniture cover 400 may exit the apparatus by means of rollers 706, which may be driven rollers. The completed furniture covers 400 may thereafter be stacked in a stack 750, and transported or stored for future use in protecting furniture.

Figure 8:
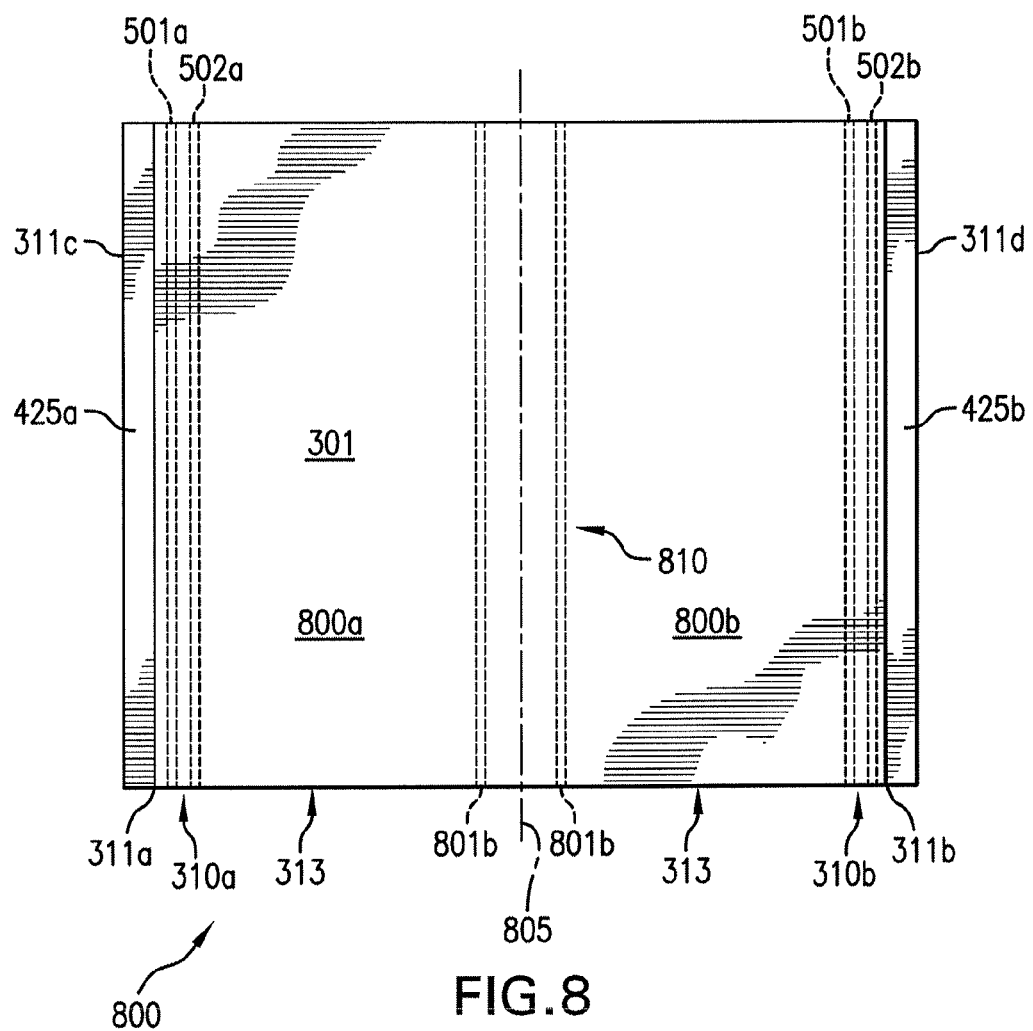
FIG. 8 is an example top view of a further example embodiment of a foam-film composite in accordance with the present disclosure divisible into two sheets.

In a further embodiment, a foam-film composite may include an additional sealed portion provided on either side of a longitudinal axis running generally through the middle of, or a central portion of, or an intermediate portion of the composite. This intermediate sealed portion may thus be displaced from the first and second sealed portions by at least about a fifth, quarter, third, or half, or any fraction thereinbetween, of the transverse width of the foam sheet, such that the unsealed are includes first and second unsealed areas 313. In this manner, the composite may be cut longitudinally along said axis to make two sheets with film attached to the foam at areas proximate to the edge of either resultant sheet. By cutting along the axis, edges may generally be made aligned with one another, and each resultant sheet will have film overhang areas, e.g., 425a, 425b. In one embodiment, as shown in FIG. 8, a foam-film composite sheet 800 has an intermediate sealed portion 810 with two seal lines 801a, 801b running longitudinally on either side of a central axis 805. When a cut is made along this axis, the sheet 800 may be divided into approximate half-sheets 800a, 800b, as described above.

Figure 9:
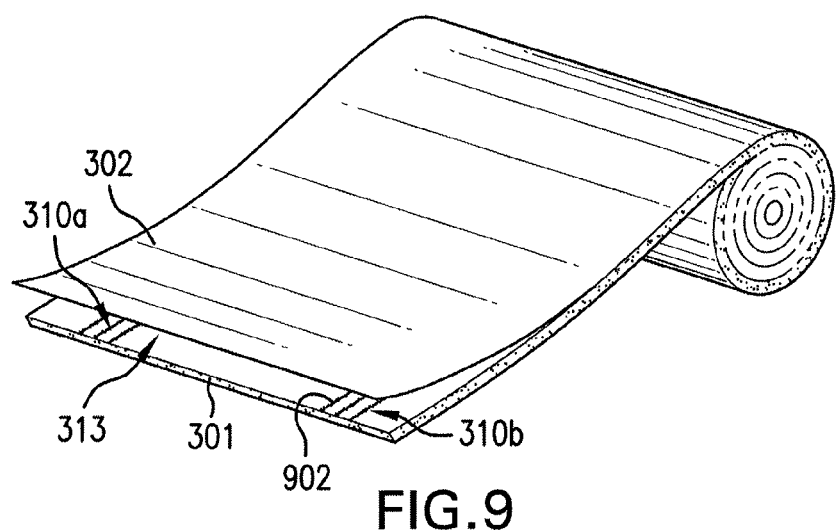
FIG. 9 is a perspective view of another embodiment of a foam-film composite in accordance with the disclosure.

FIG. 9, shows an embodiment of a roll of foam-film composite in which the width of the film and foam sheets 302,301 are equal. The sealed areas 310a,b of film and foam sheets 302,301 are adhered to each other by several strands 902 of fiberized PSA hot melt. Although other patterns and number of strands can be used, the strands 902 are laid out in three lines in each sealed area 310a,b in the embodiment shown.

Figure 10A:
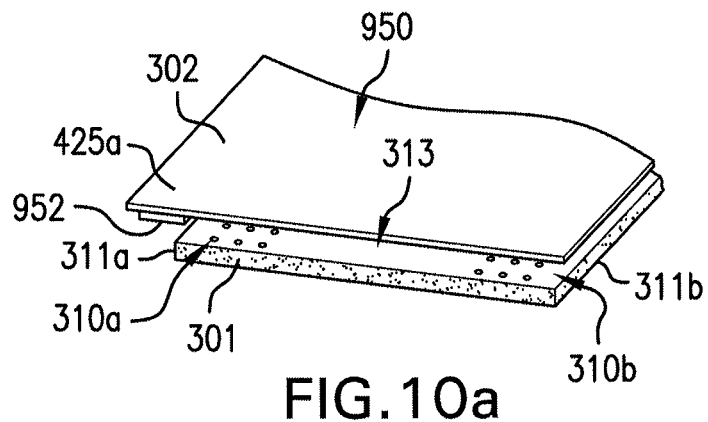
FIGS. 10a and b are a perspective and cutaway end view, respectively, of an embodiment of a foam-film composite with an overhanging lip.
Figure 10B:
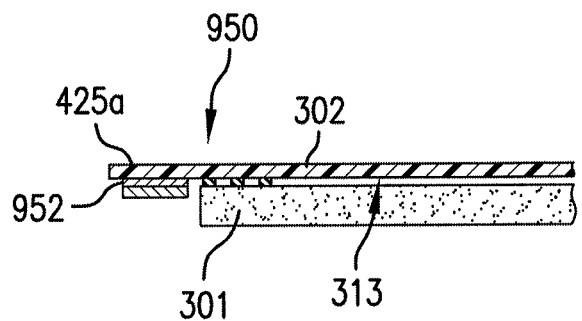
Figure 11:
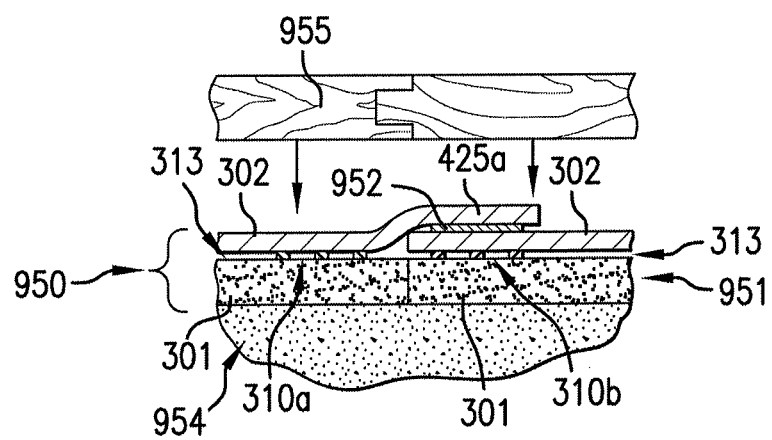
FIG. 11 is a cross-sectional view of a flooring underlayment composite of FIG. 10a being installed as flooring underlayment.

An embodiment of a foam-film composite 950 is shown in FIGS. 10a,b configured and used an flooring underlayment. The foam sheet 301 is adhered in the sealed areas 310a,b by longitudinal rows of adhesive laid down in dots, although other patterns and sealing methods can by used. This embodiment has a single overhang area 425a that extends beyond the corresponding lateral edge 311a of the foam sheet 301. The opposite lateral edge 311e of the film sheet 302 can be collocated, such as juxtaposed, with the corresponding lateral edge of the 311b of the foam sheet 301, or alternatively film edge 311e can be displaced towards the center of the foam sheet 301 or near the edge 311a in some applications. The overhang 425a can be used as a lip to lay over an adjacent foam-film composite sheet 951 and optionally includes an adhesive layer 952 on a side of the film material 302 that is attached to the foam material 301, to attach to the adjacent sheet, as shown in FIG. 11. A removable release layer, as known in the art, can be provided on the lip adhesive 952 which can be removed before adhering to the adjacent sheet 951. The adhesive on the lip can alternatively be provided on the opposite side of the composite sheet 950, on the side of the film material 302 or other surface of the composite 950 that faces away from the foam material 301, for adhering to the lip of an adjacent foam-film composite sheet that is laid thereover.

Referring to FIG. 11, the foam-film composite sheet 950 underlayment can be placed on subflooring 954, typically of concrete, either with the film facing up or down. The lip 425a is laid over the adjacent foam-film composite sheet 951 and preferably adhered thereto. Where the film 302 sheets of the adjacent composite sheets 950,951 substantially completely cover the installed foam sheets 301, the film sheets 302 can cooperatively provide a moisture barrier. Flooring 955, for example made from hardwood, engineered flooring, or other flooring material is laid on the foam-film composite sheets 950,951.

In still a further embodiment, a foam-film composite may include an additional layer of material on a side of the foam sheet opposite the film sheet. Said additional layer may be a plastic material, e.g., a polymer sheet or an extrudate comprises of one or more of the various materials described above. Such additional layer may be attached, connected with, or otherwise adhered to the foam layer in any of the manners discussed above, e.g., thermo-sealing, laminating, adhesives, hot-melt, glue, etc.

It will be appreciated that with regard to any of the above-described embodiments in this disclosure, the word "layer" or "sheet" may refer to a single layer or sheet of material, or it may refer to multiple layers or sheets of material. Such multiple layers or sheet may be made from a single material, or a combination of materials, as described above.

While the presently disclosed foam-film composite has been disclosed with respect to furniture covers, e.g., when such composites are C-folded and transversely cut/sealed, it will be appreciated that there may be may other uses of such composites, including, but not limited to, other types of covers and bags, flooring covers and flooring underlayment for wood or laminated flooring for example.

As used herein, the terms "front," "back," "upper," "lower," "side" and/or other terms indicative of direction are used herein for convenience and to depict relational positions and/or directions between the parts of the embodiments. It will be appreciated that certain embodiments, or portions thereof, can also be oriented in other positions. In addition, the term "about" should generally be understood to refer to both the corresponding number and a range of numbers. In addition, all numerical ranges herein should be understood to include each whole integer within the range.

While illustrative embodiments of the foam-film composite have been disclosed herein, it will be appreciated that numerous modifications and other embodiments may be devised by those skilled in the art. Therefore, it will be understood that the appended claims are intended to cover all such modifications and embodiments that come within the spirit and scope of the present disclosure.

What is claimed is:

1. A foam-film sheet, comprising:
   a sheet of foam material having a first lateral edge and a second lateral edge and a foam surface extending between the first lateral edge and the second lateral edge;
   a sheet of film material having a first lateral edge and a second lateral edge and a film surface extending between the first lateral edge and the second lateral edge;
   a first seal attaching the foam surface proximate its first lateral edge to the film surface proximate its first lateral edge; and
   a second seal attaching the foam and film surfaces closer to the second lateral edges than the first seal;
   wherein the foam surface and the film surface extend between the first seal and the second seal and are detached from each other in an unsealed area that is disposed between the first seal and the second seal such that the film is able to slide with respect to the foam in the unsealed area and the foam surface and the film surface face each other at the first seal, the second seal, and across the unsealed area.

2. The foam-film sheet of claim 1, wherein the foam material is a low density polyethylene, wherein the film material is a high density polyethylene, and wherein the first and second seals comprise a hot-melt glue.

3. The foam-film sheet of claim 1, wherein the foam material has a width between the first and second edges thereof, and the first and second seals are positioned within about 10% of the foam material width from the respective first and second lateral edges of the foam material.

4. The foam-film sheet of claim 1, wherein the foam material has a width between the first and second edges thereof, and the first and second seals are positioned within about 5% of the foam material width from the respective first and second lateral edges of the foam material.

5. The foam-film sheet of claim 1, wherein the first and second seals are positioned within about 5 inches from the respective first and second lateral edges of the foam material, and the foam material is at least about 106 inches wide between the first and second lateral edges thereof.

6. The foam-film sheet of claim 1, wherein the foam material has a width between its first and second edges, and the film material has a width between its first and second edges that is greater than the foam material width, such that the film material includes an overhang extending laterally beyond at least one of the first and second edges of the foam material.

7. The foam-film sheet of claim 6, the overhang extending beyond both the first and second edges of the foam material.

8. The foam-film sheet of claim 6, wherein the overhang extends over only the first edge of the foam material.

9. The foam-film sheet of claim 8, further comprising an adhesive with a release layer on the overhang on a side of the film material that is sealed to the film material.

10. The foam-film sheet of claim 1, wherein the foam-film sheet is C-folded about a longitudinal axis thereof with the film in the interior of the C-fold.

11. The foam-film sheet of claim 1, wherein the first and second seals are continuous.

12. The foam-film sheet of claim 1, wherein at least one of the seals is discontinuous.

13. The foam-film sheet of claim 1, wherein at least one of the seals comprises a plurality of adjacent seal lines disposed near the respective foam material edge.

14. The foam-film sheet of claim 1, wherein the second seal is disposed proximate the second lateral edge of the foam material.

15. The foam-film sheet of claim 14, wherein the film and foam are substantially unsealed along the entire transverse width between the first and second sealed portions near the lateral edges of the foam material.

16. The foam-film sheet of claim 14, further comprising an intermediate sealed portion displaced from the first and second sealed portions by at least about a third of the transverse width of the foam sheet, such that the unsealed area includes first and second unsealed areas.

17. The foam-film sheet of claim 14, wherein the distance between first and second lateral edges of the film material and the foam material is between about 40 inches and 200 inches.

18. The foam-film sheet of claim 14, wherein the foam material has a foam lateral width measured between the first and second edges thereof, and wherein the lateral width of the unsealed area is at least 50% of the foam lateral width.

19. The foam-film sheet of claim 14, wherein the foam material has a foam lateral width measured between the first and second edges thereof, and wherein the lateral width of the unsealed area is at least 75% of the foam lateral width.

20. The foam-film sheet of claim 14, wherein the foam material has a foam lateral width measured between the first and second edges thereof, and wherein the lateral width of the unsealed area is at least 95% of the foam lateral width.

21. The foam-film sheet of claim 14, wherein:
the foam material has a foam lateral width measured between the first and second edges thereof;
the film material has a film lateral width measured between the first and second edges thereof; and
the lateral width of the unsealed area is at least 75% of at least one of the foam lateral width or film lateral width.

22. A furniture bag material, comprising the foam-film sheet of claim 1, wherein the foam and film materials are capable of being heat sealed and heat cut transversely through a C-folded sheet to form a furniture bag having closed sides at the C-fold and closed sides at the transverse heat seals.

23. A furniture bag material, comprising:
the foam-film sheet of claim 1, wherein the foam-film sheet is C-folded about a longitudinal axis, with approximately a first half of the foam-film sheet on one side of the axis and approximately a second half of the foam-film sheet on another side of the axis, and wherein first and second edges thereof are adjacent to one another; and
a first transverse seal through the C-fold, thereby sealing the first half to the second half at the first transverse seal, and a second transverse seal through the C-fold at a distance from the first transverse seal, thereby sealing the first half to the second half at the second transverse seal, wherein an opening between the adjacent first and second edges is dimensioned to allow for insertion over a piece of furniture.

24. The foam-film furniture cover of claim 23, wherein the film material is on the inside of the C-fold and the foam material is on the outside of the C-fold, and the unsealed area allows the film to slide with respect to the foam to protect the furniture against abrasion.

25. A foam-film sheet for protecting a furniture article, comprising:
a sheet of film material having a first lateral edge and a second lateral edge;
a sheet of foam material having a first lateral edge and a second lateral edge and a first surface between the first lateral edge and the second lateral edge attached to the film material and a second surface area on the opposite side of the sheet of foam as the first surface, wherein the second surface area is free of film material such that the second surface area forms an outer most surface of the foam-film sheet;
a first seal between a portion of the foam material on the first surface proximate its first lateral edge and a portion of the film material proximate its first lateral edge; and
a second seal between a portion of the foam material on the first surface proximate the second lateral edge and a portion of the film material;
wherein the foam material and film material are detached from each other in an unsealed area disposed between the first seal and the second seal such that the film is able to slide with respect to the foam in the unsealed area.

26. The foam-film sheet of claim 25, wherein the second surface area is the entire second surface opposite the first surface.

27. A furniture bag material, comprising the foam-film sheet of claim 25, wherein:
the foam-film sheet is C-folded about a longitudinal axis; and
the second surface area of the sheet of foam material being free of film material forms an outermost surface of the furniture bag.

28. A furniture bag material, comprising: the foam-film sheet of claim 25, wherein the foam-film sheet is C-folded about a longitudinal axis; and the second surface area of the sheet of foam material being free of film material forms an inner most surface of the furniture bag and is configured to contact the furniture article.

* * * * *